United States Patent
Parnell

(10) Patent No.: US 8,980,375 B1
(45) Date of Patent: Mar. 17, 2015

(54) CATALYST DIP

(71) Applicant: Callaway Golf Company, Carlsbad, CA (US)

(72) Inventor: Shane R. Parnell, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 14/047,280

(22) Filed: Oct. 7, 2013

Related U.S. Application Data

(63) Continuation-in-part of application No. 13/489,216, filed on Jun. 5, 2012, now Pat. No. 8,551,567.

(60) Provisional application No. 61/494,302, filed on Jun. 7, 2011.

(51) Int. Cl.
| | |
|---|---|
| *B05D 3/10* | (2006.01) |
| *C08J 7/06* | (2006.01) |
| *A63B 37/00* | (2006.01) |
| *C08G 18/16* | (2006.01) |
| *C09D 175/04* | (2006.01) |
| *C08G 18/72* | (2006.01) |
| *C08G 18/08* | (2006.01) |
| *A63B 45/00* | (2006.01) |
| *B05D 1/18* | (2006.01) |

(52) U.S. Cl.
CPC .............. *C08J 7/065* (2013.01); *A63B 37/0022* (2013.01); *A63B 37/0023* (2013.01); *B05D 3/107* (2013.01); *B05D 3/10* (2013.01); *C08G 18/16* (2013.01); *C09D 175/04* (2013.01); *A63B 37/0003* (2013.01); *C08G 18/72* (2013.01); *C08G 18/0895* (2013.01); *A63B 45/00* (2013.01); *B05D 1/18* (2013.01); *B05D 3/108* (2013.01); *A63B 37/0024* (2013.01)
USPC ....................................... 427/372.2

(58) Field of Classification Search
None
See application file for complete search history.

(56) References Cited

U.S. PATENT DOCUMENTS

| | | | | |
|---|---|---|---|---|
| 2002/0167116 | A1* | 11/2002 | Inoue et al. | 264/331.11 |
| 2007/0087863 | A1* | 4/2007 | Matroni et al. | 473/371 |
| 2010/0227709 | A1* | 9/2010 | Sullivan et al. | 473/374 |
| 2011/0186329 | A1* | 8/2011 | Makal et al. | 174/113 R |

* cited by examiner

*Primary Examiner* — Erma Cameron
(74) *Attorney, Agent, or Firm* — Michael A. Catania; Sonia Lari; Rebecca Hanovice

(57) ABSTRACT

The present invention relates to a method for forming a golf ball. The method comprises mixing a polyisocyanate crosslinker with a base TPU cover material, wherein the polyisocyanate crosslinker is aliphatic, miscible with the base TPU cover material and has functionalities greater than or equal to 2. The method further comprises dipping a golf ball in a catalyst solution, wherein the catalyst solution is allowed to absorb into a cover of the golf ball and heating the golf ball to allow continued diffusion of the catalyst solution into the cover of the golf ball.

5 Claims, 1 Drawing Sheet

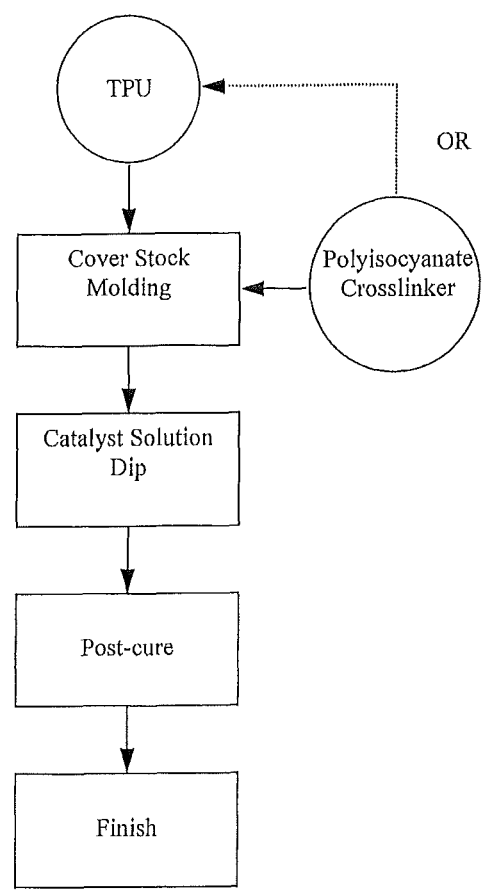

CATALYST DIP

CROSS REFERENCES TO RELATED APPLICATIONS

The Present application is a continuation-in-part application of U.S. patent application Ser. No. 13/489,216, filed on Jun. 5, 2012, now U.S. Pat. No. 8,651,567, which issued on Oct. 8, 2013, which claims priority to U.S. Provisional Patent Application No. 61/494,302, filed on Jun. 7, 2011, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention relates to a method for improving golf ball covers. More specifically, the present invention relates to a method for improving the cover shear durability of golf ball covers.

2. Description of the Related Art

When used in golf ball cover stock, injection moldable thermoplastic polyurethanes offer significant economic advantages over thermoset polyurethanes and polyureas. They can also be formulated to exhibit attractive properties with good "feel", controllability, and rebound resilience. Several methods have been used to improve the physical property profile and groove shear durability (i.e. resistance to scuffing, cutting, and tearing) of thermoplastic polyurethane ("TPU") golf ball covers. Some include incorporating polyisocyanates into the TPU cover layer either before or during injection molding in an effort to impart chemical cross-linking. For example, U.S. Pat. No. 6,663,507 and US Patent Applications 2008/0161134 and 2008/0207846 describe dry blending polyisocyanate masterbatches with TPU prior to injection molding. Disadvantages of this prior art include low polyisocyanate reactivity, conversion, cross-linking, and thus durability improvement. Conversely, high polyisocyanate reactivity in the melt can cause TPU molecular weight loss with diisocyanates and rapid molecular weight growth with triisocyanates and higher order polyisocyanates. In both cases, the resulting changes in melt viscosity limit processability, especially in the context of thin wall injection molding.

The prior art is lacking in a method that results in the use of polyisocyanates with reduced reactivity which minimizes polyisocyanate conversion in the melt and effectively decouples the molding process from polyisocyanate cross-linking, hence allowing increased processability. It has been discovered that exposing TPU cover layers to a catalyst solution following injection molding maximizes polyisocyanate conversion and thus durability.

BRIEF SUMMARY OF THE INVENTION

The present invention relates to a method for forming a golf ball. The method comprises mixing a polyisocyanate crosslinker with a base TPU cover material, wherein the polyisocyanate crosslinker is aliphatic, miscible with the base TPU cover material and has functionalities greater than or equal to 2. The method further comprises dipping a golf ball in a catalyst solution, wherein the catalyst solution is allowed to absorb into a cover of the golf ball and heating the golf ball to allow continued diffusion of the catalyst solution into the cover of the golf ball. An aspect of the present invention is a method for forming a cover for a golf ball. The method includes mixing a polyisocyanate crosslinker with a base thermoplastic polyurethane material to form an injection molding material. The composition by weight of the polyisocyanate crosslinker ranges from 17 percent to 27 percent of the injection molding material and the composition by weight of the base thermoplastic urethane ranges from 63 percent to 73 percent of the injection molding material. The polyisocyanate crosslinker is aliphatic and miscible with the base thermoplastic polyurethane material. The method also includes injection molding a cover for a golf ball from the injection molding material. The method also includes dipping the golf ball in a catalyst solution wherein the catalyst solution comprises an organometallic compound, wherein the catalyst solution is allowed to absorb into the cover for the golf ball. The method also includes heating the golf ball to allow continued diffusion of the catalyst solution into the cover for the golf ball.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 1 is a flow diagram of the method of the present invention.

DETAILED DESCRIPTION OF THE INVENTION

Polyisocyanates are mixed with the base TPU cover material before or during injection molding. Preferred polyisocyanates are aliphatic to limit reactivity, are miscible with the base TPU, and have functionalities ≥2 to maximize final crosslink density. Preferably, they are added in masterbatch form and dry blended with the base TPU cover stock before injection molding. These masterbatches can be made on a twin screw extruder and TPU or other thermoplastic elastomers can be used as carrier resins.

As shown in FIG. 1, the method of the present invention comprises missing a polyisocyanate crosslinker with a base TPU over cover stock molding, dipping the golf ball in the catalysts dip solution and post-curing the golf ball.

Subsequent to injection molding, balls are dipped in a catalyst solution whereby the catalyst is allowed to absorb or diffuse into the cover of the golf ball. Preferred catalysts include organometallic compounds normally used in isocyanate reactions. Preferred solvents include acetone. After dipping, the balls are heated to remove solvent and to allow continued diffusion of catalyst into the cover of the golf ball. More importantly, this post-cure step promotes the reaction of polyisocyanate with TPU.

Polyisocyanates function as crosslinkers in the TPU golf ball cover. Excess isocyanate functionality reacts with active hydrogen functionality on TPU chain ends to extend chain length and thus increase molecular weight. Similarly, excess isocyanate functionality can also react with urethane linkages to form allophanate bonds. In the presence of specific catalysts, other reactions are also possible. Ultimately, multifunctional polyisocyanate reactions result in intermolecular cross-linking which improves groove cover shear durability. Reaction type, reaction kinetics, and overall extent of reaction are largely controlled by catalyst type and concentration.

In the polyisocyanate masterbatch compounding step of the process, the polyisocyanate is compounded with a golf ball coverstock material such as Texin 1208. A typical composition includes Texin 1208/polyisocyanate=70/30 weight percent. All compounding is preferably done using a co-rotating, intermeshing, modular twin screw extruder. Melt temperatures are preferably kept below 190 Celsius to minimize premature polyisocyanate reaction with the masterbatch carrier resin. The final pelletized masterbatch is sealed in an airtight container with desiccant.

The masterbatch is dry blended with a thermoplastic polyurethane ("TPU") e.g. Texin 1208, and a color masterbatch ("MB") and the resulting mixture is injection molded into golf ball coverstock. A typical composition includes TPU/polyisocyanate MB/color, MB=68/22/10 weight percent, resulting in a final polyisocyanate concentration of approximately 6.6 weight percent. Lower concentrations of polyisocyanate masterbatch also work well but result in less groove shear durability improvement. Higher concentrations do not improve durability further and only result in lower green strength and other processing problems. This applies to the polyisocyanate noted above and will change for other polyisocyanates. In general, polyisocyanate concentrations might range 1-10 weight percent. It is important to note that the polyisocyanate used in this invention can also be compounded with the base TPU prior to injection molding (as opposed to dry blending a MB), can be dry blended as a solid in the pure form with TPU before injection molding, or can be heated and pumped as a liquid into the barrel/screw assembly during injection molding.

After de-gating and other potential surface preparation operations such as seam buff and vanmark for pin flash removal, the above golf balls are dipped in a catalyst solution containing acetone and an organometallic catalyst. A typical catalyst solution composition includes acetone/organometallic catalyst=99.99/0.01 weight percent; however, a range of catalyst concentrations (0.002-0.05 weight percent) appear to work well. The balls are dipped in the catalyst solution for approximately 1-2 minutes to allow for diffusion of the solution into the cover of the balls.

The balls are heated to remove solvent and to allow continued diffusion of catalyst solution into the cover of the golf ball. More importantly, in the presence of catalyst this post-cure step promotes the reaction of polyisocyanate with TPU to improve groove shear durability. Typical post-cure conditions include 175° Fahrenheit for 2 hours; however, a range of temperatures (150-200° Fahrenheit) and times (1-4 hours) appear to work well.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention the following:

1. A method for forming a cover for a golf ball, the method comprising:
    mixing a polyisocyanate crosslinker with a base thermoplastic polyurethane material to form an injection molding material, wherein the composition by weight of the polyisocyanate crosslinker ranges from 17 percent to 27 percent of the injection molding material and wherein the composition by weight of the base thermoplastic urethane ranges from 63 percent to 73 percent of the injection molding material, wherein the polyisocyanate crosslinker is aliphatic and miscible with the base thermoplastic polyurethane material;
    injection molding a cover for a golf ball from the injection molding material;
    dipping the golf ball in a catalyst solution wherein the catalyst solution comprises an organometallic compound, wherein the catalyst solution is allowed to absorb into the cover for the golf ball; and
    heating the golf ball to allow continued diffusion of the catalyst solution into the cover for the golf ball.

2. The method according to claim 1 wherein the polyisocyanate crosslinker is added in a masterbatch form and compounded with the base thermoplastic polyurethane material before injection molding.

3. The method according to claim 1 wherein the polyisocyanate crosslinker is heated and pumped as a liquid into the base thermoplastic polyurethane material during injection molding.

4. A method for forming a golf ball cover, the method comprising:
    mixing a polyisocyanate crosslinker with a base thermoplastic polyurethane material to form an injection molding material during an injection molding of a cover for a golf ball, wherein the polyisocyanate crosslinker is aliphatic, miscible with the base thermoplastic polyurethane material and has functionalities greater than or equal to two;
    dipping the golf ball in a catalyst solution wherein the catalyst solution comprises an acetone and an organometallic compound, wherein the catalyst solution is allowed to absorb into the cover of the golf ball; and
    heating the golf ball to allow continued diffusion of the catalyst solution into the cover of the golf ball.

5. The method according to claim 4 wherein heating of the golf ball is conducted at a temperature ranging from 150 to 200 degrees Fahrenheit for a duration of 1 to 4 hours.

* * * * *